United States Patent [19]
Veronesi

[11] Patent Number: 5,680,201
[45] Date of Patent: Oct. 21, 1997

[54] APPARATUS FOR INCLUDING TANK CIRCUIT WITH SHIELDED, SINGLE TURN COIL, DETECTING PASSAGE OF END OF WORKPIECE

[75] Inventor: William A. Veronesi, Glastonbury, Conn.

[73] Assignee: Carrier Corporation, Syracuse, N.Y.

[21] Appl. No.: 961,608

[22] Filed: Oct. 15, 1992

[51] Int. Cl.$^6$ .................................................. G01B 7/14
[52] U.S. Cl. .................. 324/207.26; 324/207.16; 324/207.24; 331/65
[58] Field of Search ............ 324/207.16, 207.24, 324/207.26, 234, 236, 237, 238; 331/65; 361/180; 340/941; 164/4.1, 451, 150.1, 151.2

[56] References Cited

U.S. PATENT DOCUMENTS

| | | | |
|---|---|---|---|
| 2,869,074 | 1/1959 | Clapp | 324/234 |
| 3,364,465 | 1/1968 | Prucha | 340/941 |
| 3,737,764 | 6/1973 | Dufayet | 324/237 |
| 3,818,430 | 6/1974 | Williams | 340/941 |
| 4,333,052 | 6/1982 | Schmall | 324/236 |
| 4,350,954 | 9/1982 | Seilly | 324/207.16 |
| 4,486,710 | 12/1984 | Schmidt | 324/179 |
| 4,841,244 | 6/1989 | Chambers | 324/204 |
| 4,912,407 | 3/1990 | Gualtieri et al. | 324/207.16 X |
| 4,926,120 | 5/1990 | Veronesi et al. | 324/204 |
| 4,983,914 | 1/1991 | Baranski | 324/207.26 X |
| 5,041,856 | 8/1991 | Veronesi et al. | 324/204 |
| 5,198,811 | 3/1993 | Potter et al. | 340/941 X |

*Primary Examiner*—Gerard R. Strecker

[57] ABSTRACT

Apparatus for detecting the end of a workpiece as it passes a given point. The output of the apparatus can be used as an input to a display or to a device that controls manufacturing, materials handling or like processes. The apparatus has a sensor comprising a single turn inductive coil that surrounds a point at which it is desired to detect the passage of an end of the workpiece. The coil is connected in parallel with a capacitor to form a tank circuit. An integrated circuit has a variable frequency oscillator that excites the tank circuit at its resonant frequency. The integrated circuit produces an output signal that is proportional to the frequency at which the oscillator is operating. As the end of a workpiece passes through the coil, the inductance of the coil changes, causing a change in the resonant frequency of the tank circuit, a change in the oscillator frequency and a change in the output signal. The output signal can be used as an input to a variety of display and control devices.

4 Claims, 2 Drawing Sheets

APPARATUS FOR INCLUDING TANK CIRCUIT WITH SHIELDED, SINGLE TURN COIL, DETECTING PASSAGE OF END OF WORKPIECE

BACKGROUND OF THE INVENTION

This invention relates generally to devices for use, for example, in manufacturing process display and control applications. More particularly, this invention relates to an apparatus for use in such applications that, for example, involve the handling and processing of pipe, tube, rod, bar stock and the like.

In manufacturing and related processes, there are a large number of applications where it is necessary to detect an end of a workpiece as it passes a given point. One example is in the handling and processing of pipe, tube, rod or bar stock. Such material must frequently be cut to or otherwise provided in a desired length for use in further manufacturing steps. It is also usually necessary that the lengths of the prepared materials be known with some degree of accuracy. If the lengths are handled by moving from one position to another at a known speed, then the length of material can be determined by an apparatus having a sensor that detects the passage of an end of the material and a timer. The sensor detects the passage of one end of the material then some time later detects the passage of the other end. By knowing the time difference between the two passage events and the speed of material travel, the length of material can be determined. It is also possible to compare the lengths of prepared materials against a standard length or each other by use of one or more sensors than can detect the end of a piece of material.

Such a sensor should be capable of more than just detecting the presence or absence of material within its detection range. A common example of the need for such a capability is in machinery that cuts lengths of nonferrous material and then ejects it from the machine with a steel ejector ram. For quality control purposes, it may be desirable to measure the length of the cut material as it leaves the machine. In such an application, the sensor should be able to detect not only the passage of the free end of the material but also the passage of the end that is in contact with the ram.

For satisfactory performance, a sensor apparatus should be able rapidly to detect a passage event with a high degree of precision. The apparatus should be rugged and capable of operating in hostile environments such as are frequently found in and in close proximity to industrial machinery.

An apparatus having a sensor of the mechanical type can offer ruggedness but not necessarily a short response time. An apparatus having an optical sensor can satisfy speed and accuracy requirements but may not be able to perform adequately in an environment containing quantities of oil, grease and dirt.

An electromagnetic sensor can be made small and rugged and offers the advantage that it can be made relatively immune to the hazards of close proximity to an industrial machine.

One approach to an electromagnetic sensor to detect a composition change is to arrange an array of air or ferrite core inductive coils, each coil with its axis aligned perpendicularly to the direction of travel of the material, about the position where it is desired to detect the change. Such a system could provide rapid and accurate detection of changes. But erroneous outputs from a sensor of this configuration will result if the centerline of the material is displaced from the centerpoint of the sensor array. Such displacements are likely in handling material in a manufacturing process and would limit the effectiveness of such a sensor. A multi-turn induction coil sensor is less sensitive to material irregularities or departures from centerline, but such a coil cannot provide the precise indication of a change in material composition required in many applications. A conventional eddy current sensor system would require comparatively complex electronic circuitry to provide a usable output from the change in impedance in the sensor caused by the change in composition of the workpiece.

SUMMARY OF THE INVENTION

The present invention is a sensor apparatus for detecting a change in the composition of electrically conductive materials passing through it. It is an electromagnetic device that is capable of precise detection, able to respond rapidly to such changes, simple, small, inexpensive and rugged in construction. Further, it is relatively immune to conditions that would reduce the effectiveness of optical sensors and produces an output that is readily usable in a process display or controller.

The sensor is a single turn induction coil electrically arranged in parallel with a capacitor to form a resonant or tank circuit. The tank circuit, through an impedance matching transformer, is part of a variable frequency oscillator circuit that is capable of oscillating at the resonant frequency of the tank circuit and of following that frequency even if it changes. Another portion of the circuit provides a square wave output whose frequency is a function of the frequency of the part of the oscillator circuit that contains the tank circuit.

In a preferred embodiment, the single turn induction coil is a single ribbon of conductive material deposited on a substrate of material suitable for use as the substrate of a printed circuit board. The substrate has a hole of a size suitable to allow the passage of a workpiece through it. The ribbon of conductive material surrounds the hole to form the coil. The other components of the sensor apparatus are mounted on the substrate to form a compact and rugged unit.

In a steady state condition, the oscillator output will be at some constant value. Should the inductance of the sensor coil change, the resonant frequency of the tank circuit will change and the output of the oscillator will also change to some new value. The inductance change could be the result of an electrically conductive workpiece entering the previously empty center of the coil, an electrically conductive workpiece being removed from the center of the coil, leaving it empty, or a workpiece composed of a material (e.g. a steel ejector ram) having one value of conductivity replacing a workpiece composed of a material (e.g. a copper bar, rod, pipe or tube) having some other value of conductivity in the coil center. Thus the change in the oscillator output frequency will indicate that an event has occurred in the center of the sensor coil: an event such as the passage of a workpiece end or a change in the composition (e.g. from copper to steel) in the material that is passing through the sensor. A simple counting circuit can detect the oscillator frequency change. The detection of the event can be used in a process display or control device with other suitable inputs to serve as an automatic measuring device, to control the operation of machinery such as a cutter or positioner or as a quality control checker able to reject workpieces that are out of specification.

Because only the frequency of the output of the sensor apparatus need be measured to detect the occurrence of a change in the sensor coil inductance, the apparatus is particularly suited to an environment, such as in an industrial plant, where the noise-free transmission and reception of analog voltages or currents might be difficult.

BRIEF DESCRIPTION OF THE DRAWINGS

The accompanying drawings form a part of the specification. Throughout the drawings, like reference numbers identify like element.

DESCRIPTION OF THE PREFERRED EMBODIMENT

Figure 1:
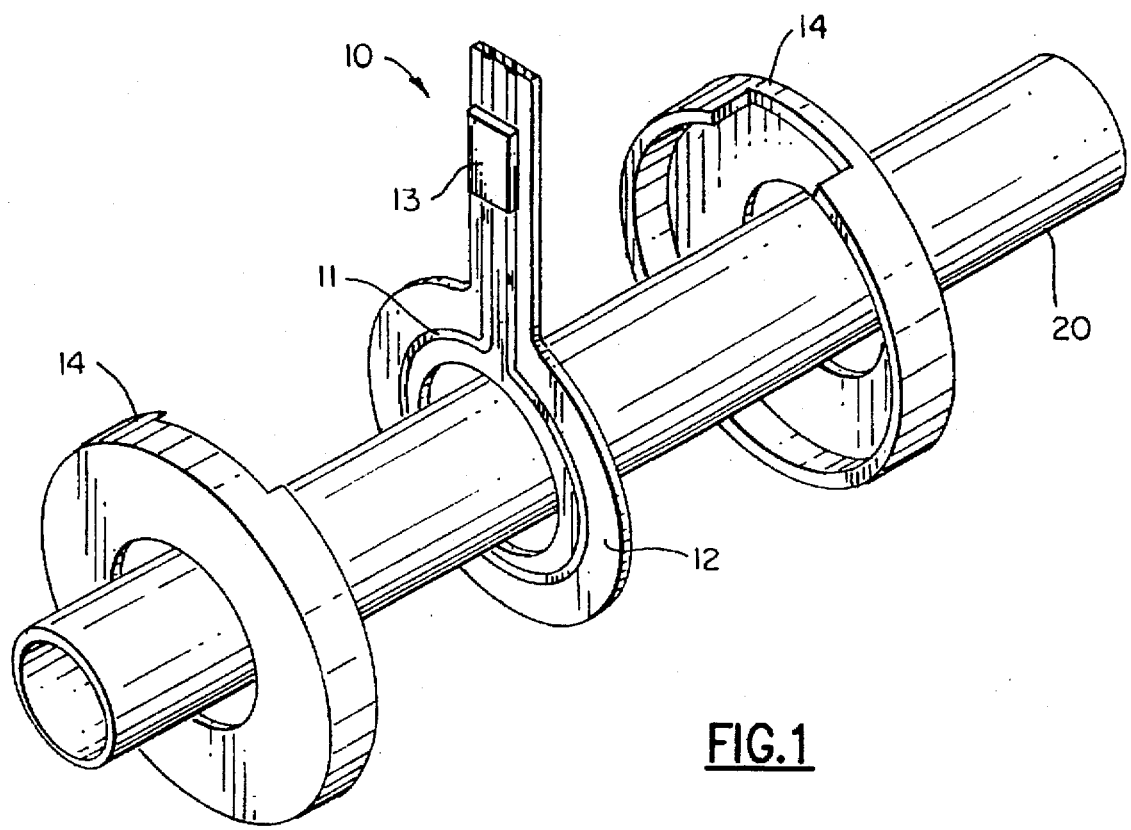
FIG. 1 is an isometric view of a preferred embodiment of the invention with a cylindrical workpiece positioned within it.

FIG. 1, in an isometric view, illustrates a preferred embodiment of the present invention. The figure shows sensor apparatus 10 with workpiece 20 positioned within it. Work piece 20, as shown, is a hollow cylindrical member such as a pipe or tube but could be of some other configuration such as a bar or rod. It is important that workpiece 20 be composed of a material, such as a metal, that is electrically conductive. Sensor apparatus 10 comprises sensor coil 11 deposited on printed circuit board 12. Sensor coil 11 is a ribbon of an electrically conductive material such as copper or a copper alloy forming a single turn inductor through which a workpiece such as workpiece 20 may pass. Printed circuit board 12 is a substrate of a suitable material for such an application. Component package 13 is affixed to circuit board 12 and contains the remaining components of sensor apparatus 10. Shield halves 14, in the figure shown spread apart, surround sensor apparatus 10 and, when placed in contact with each other around the apparatus, provide a grounded electrical shield as well as mechanical protection for the apparatus.

Figure 2:
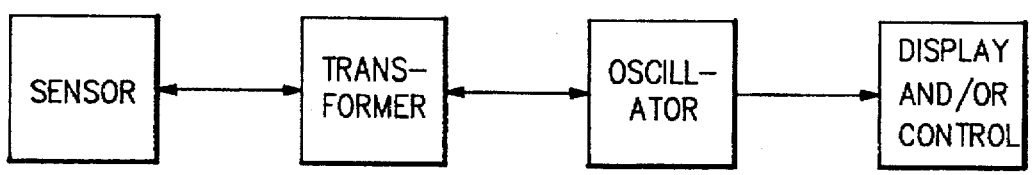
FIG. 2 is a block diagram of the sensor apparatus of the present invention.

FIG. 2 is a block diagram of the apparatus of the present invention. The sensor is a tank circuit comprising sensor coil 11 (FIG. 1) and a capacitor interconnected with the oscillator by an impedance matching transformer. A change in the impedance of sensor coil 11 will cause a change in the resonant frequency of the tank circuit. The change in resonant frequency will result in a change in the output frequency of the oscillator. The oscillator output frequency is directed to a suitable display or control device, where a change in frequency will be detected and used for the desired application.

Figure 3:
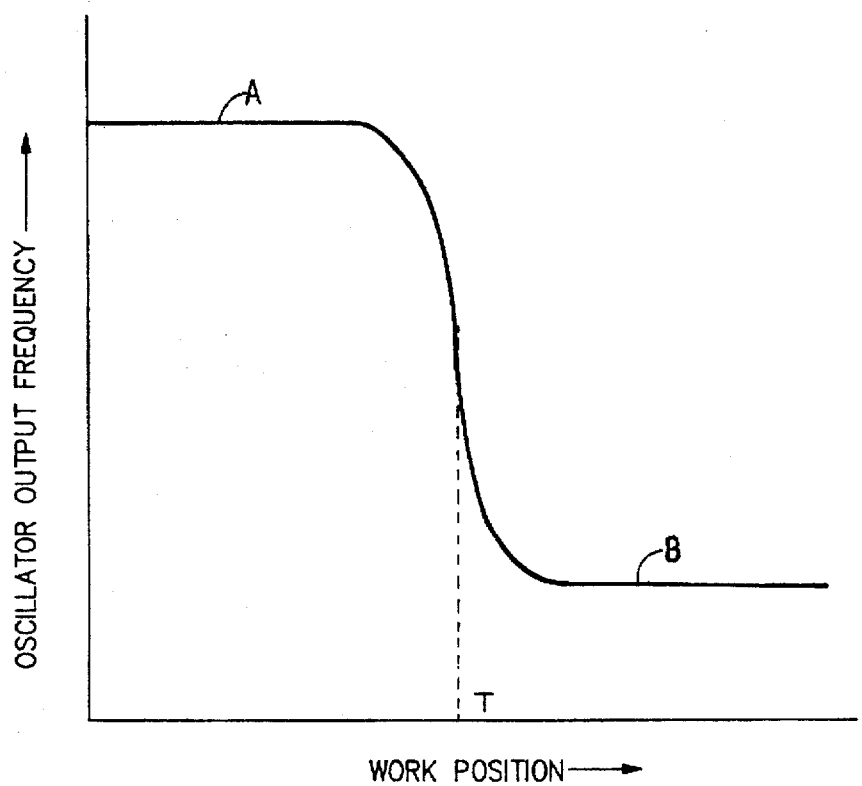
FIG. 3 is a graph showing output frequency as a function of work position.

FIG. 3, a graph of oscillator output frequency as a function of work position, illustrates how the apparatus of the invention detects a workpiece end. Portion A of the curve in the figure shows the oscillator frequency output when there is a work piece composed of one conductive material such as copper in the center of sensor coil 11. Portion B of the curve shows the oscillator frequency output when the composition of the material in the sensor coil changes, as when a steel ejector ram pushes a copper pipe or tube out of and replaces the copper workpiece in the center of the coil. The change from one material to the other is measured as at position T. The accuracy of the detection of the transition event can be made very high, to as little as 25 microns.

Figure 4:
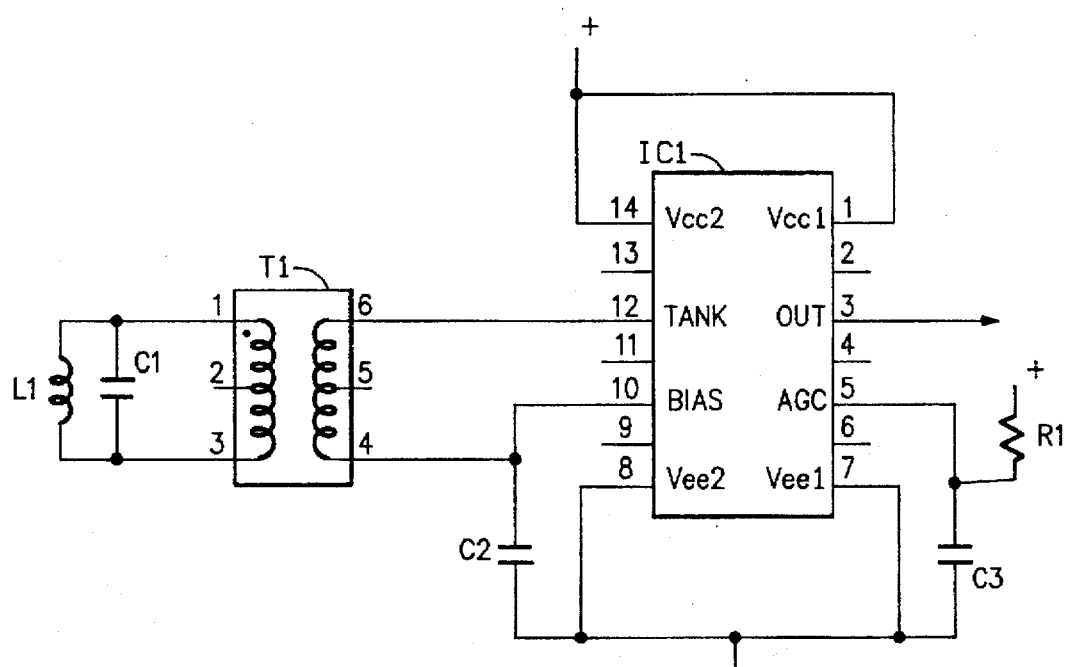
FIG. 4 is a circuit diagram of a preferred embodiment of the present invention.

FIG. 4 is a circuit diagram of a preferred embodiment of the present invention. The major components of the circuit include inductor L1, which is sensor coil 11 in FIG. 1, electrically connected in parallel with capacitor C1 to form a tank circuit. The tank circuit is connected to terminals of integrated circuit IC1 through impedance matching transformer T1. A good choice for IC1 is a Motorola® MC 1648 chip. A good choice for T1 is a Mini-Circuits T36-IT transformer. Circuit IC1 receives power from a direct current supply of an appropriate voltage at points +. Capacitors C2 and C3 provide a path to ground for any alternating current in their respective lines. Resistor R1 is a current limiting resistor. The capacitance of capacitor C1 should be chosen so that, considering the range of values of inductance that inductor L1 may have, the resonant frequency of the tank circuit will remain in the frequency range within which circuit IC1 is capable of oscillating. The respective capacitances of capacitors C2 and C3, as well as the resistance of resistor R1 should be selected so as to be able to perform their respective functions. In this embodiment, the output signal, seen at OUT, is a square wave whose period is proportional to the frequency at which the variable frequency oscillator is operating.

I claim:

1. Apparatus (10) for detecting indicating the passage of an end of a moving, electrically conductive workpiece (20) through a given point, comprising:

a shielded single turn electrically conductive ribbon coil (11, L1) surrounding said point at a distance so as to allow said workpiece to pass through said ribbon coil, said coil being capable of detection of the end of said workpiece within approximately 25 microns accuracy;

capacitance means (C1) electrically connected to said single turn ribbon coil so as to form a tank circuit in which said single turn ribbon coil is the sole conductor;

variable frequency oscillator means (IC1) electrically connected to said tank circuit and capable of exciting said tank circuit at its resonant frequency even as said resonant frequency varies as the inductance of said single turn ribbon coil varies as a function of the presence, absence or composition of said workpiece in said single turn ribbon coil; and output means (IC1) in electrical communication with said variable frequency oscillator means and producing an electrical output proportional to the frequency at which said variable frequency oscillator is operating;

whereby upon passage of said workpiece through said ribbon coil said output means produces an electrical output indicating detection of said workpiece end within approximately 25 microns.

2. The apparatus of claim 1 further comprising an impedance matching transformer (T1) electrically connected between said tank circuit and said variable frequency oscillator means.

3. The apparatus of claim 1 in which said single turn ribbon coil is deposited on a nonconductive substrate and around a passage through said substrate; and said capacitance means, said variable frequency oscillator means and said output means are all mounted on said substrate.

4. The apparatus of claim 1 in which said electrical signal from said output means is a square wave.

* * * * *